(12) United States Patent
Smith (10) Patent No.: US 8,428,978 B1
(45) Date of Patent: *Apr. 23, 2013

(54) SYSTEMS AND METHODS FOR PROVIDING ENHANCED SERVICE USING PUBLIC RECORDS

(75) Inventor: Arthur Q. Smith, Fredericksburg, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/312,654

(22) Filed: Dec. 6, 2011

Related U.S. Application Data (63) Continuation of application No. 11/740,817, filed on Apr. 26, 2007, now Pat. No. 8,073,715.

(51) Int. Cl.
*G06Q 40/00* (2012.01)

(52) U.S. Cl.
USPC ............................................ 705/4; 705/36 R (58) Field of Classification Search ........................ 705/4
See application file for complete search history.

(56) References Cited

U.S. PATENT DOCUMENTS

| | | | | |
|---|---|---|---|---|
| 6,842,738 | B1* | 1/2005 | Bradley et al. | 705/7.31 |
| 7,711,574 | B1* | 5/2010 | Bradley et al. | 705/306 |
| 2002/0082903 | A1* | 6/2002 | Yasuzawa | 705/10 |
| 2002/0194120 | A1* | 12/2002 | Russell et al. | 705/38 |
| 2004/0098279 | A1* | 5/2004 | Frazier | 705/1 |
| 2006/0242057 | A1* | 10/2006 | Velarde | 705/38 |
| 2007/0038533 | A1* | 2/2007 | Huff | 705/35 |
| 2007/0136104 | A1* | 6/2007 | Bowen et al. | 705/4 |
| 2007/0244780 | A1* | 10/2007 | Liu | 705/35 |
| 2011/0178906 | A1* | 7/2011 | Joye et al. | 705/35 |

OTHER PUBLICATIONS

"Homeowners Insurance: Maintaining Adequate Insurance", [online]. Insurance Department, New York State. [retrieved on Mar. 21, 2007]. Retrieved from the Internet: <URL: http://www.ins.state.ny.us/homeown/html/hmmaintn.htm>, 3 pgs.

Orman, S., "Insurance: What You Need and What You Don't", [online]. [retrieved on Mar. 21, 2007]. Retrieved from the Internet: <URL: http://au/blogs.yahoo.com/moneymatters/37/insurance-what-you-need-and-what-you-dont>, 6 pgs.

Rothfeder, J., "Beef Up Your Insurance", [online]. This Old House(r). [Retrieved on Mar. 21, 2007]. Retrieved from the Internet: <URL: http://www.thisoldhouse.com/toh/knowhow/managinghome/articles/0,16417,459261,00.html>, 3 pgs.

* cited by examiner

*Primary Examiner* — Jagdish Patel
*Assistant Examiner* — Kevin Poe
(74) *Attorney, Agent, or Firm* — Brooks, Cameron & Huebsch, PLLC (57) ABSTRACT

Systems and methods for providing enhanced service using public records are described. A financial institution may obtain property data from public records regarding a property associated with a customer. The retrieved property data may be compared with existing customer data. The customer may be alerted and financial data associated with the customer may be modified based on the retrieved property data. Other embodiments may be described and claimed.

20 Claims, 6 Drawing Sheets

SYSTEMS AND METHODS FOR PROVIDING ENHANCED SERVICE USING PUBLIC RECORDS

CROSS REFERENCES

This application is a Continuation of U.S. patent application Ser. No. 11/740,817 filed on Apr. 26, 2007, now U.S. Pat. No. 8,073,715, and which is related in subject matter in the following commonly assigned applications: U.S. patent application Ser. No. 11/740,842, filed on Apr. 26, 2007; and U.S. patent application Ser. No. 11/740,848, filed on Apr. 26, 2007.

TECHNICAL FIELD

Various embodiments described herein relate to computer systems generally and more specifically to systems and methods for providing enhanced service using public records.

BACKGROUND

Some financial institutions provide a number of real property related financial services. These services often rely on information relating to the property to define various characteristics. For example, homeowners insurance relies at least in part on information regarding the value of the property to determine the coverage amount. It may be the case that all of the information relating to the property does not stay constant over time. In many cases, the value of a property may increase or decrease with time due to numerous factors including inflation, economic changes, zoning, nearby construction, and many other factors. Property value and other data may change without the owner's or the financial institution's full knowledge. These changes may affect the property owner if they go unnoticed. If the value of a property, for example, were to increase, but the coverage amount on the homeowners insurance policy remained unchanged, a discrepancy may exist. In the event of damage to the property, the cost to repair may exceed the coverage amount on the insurance policy because of the increased value of the property.

SUMMARY

Systems and methods for enhanced service using public records are described. The system allows a financial institution to access public records that contain customer property related information. The customer property information that is obtained may be used to update internal records and offer or recommend financially related services. Other embodiments are also described.

DETAILED DESCRIPTION

The following detailed description is divided into four sections. The first section presents a system overview of the inventive subject matter. The second section provides methods of using example embodiments of the inventive subject matter. The third section describes example implementations. The fourth section describes the hardware and the operating environment in conjunction with which embodiments can be practiced.

System Level Overview

Figure 1:
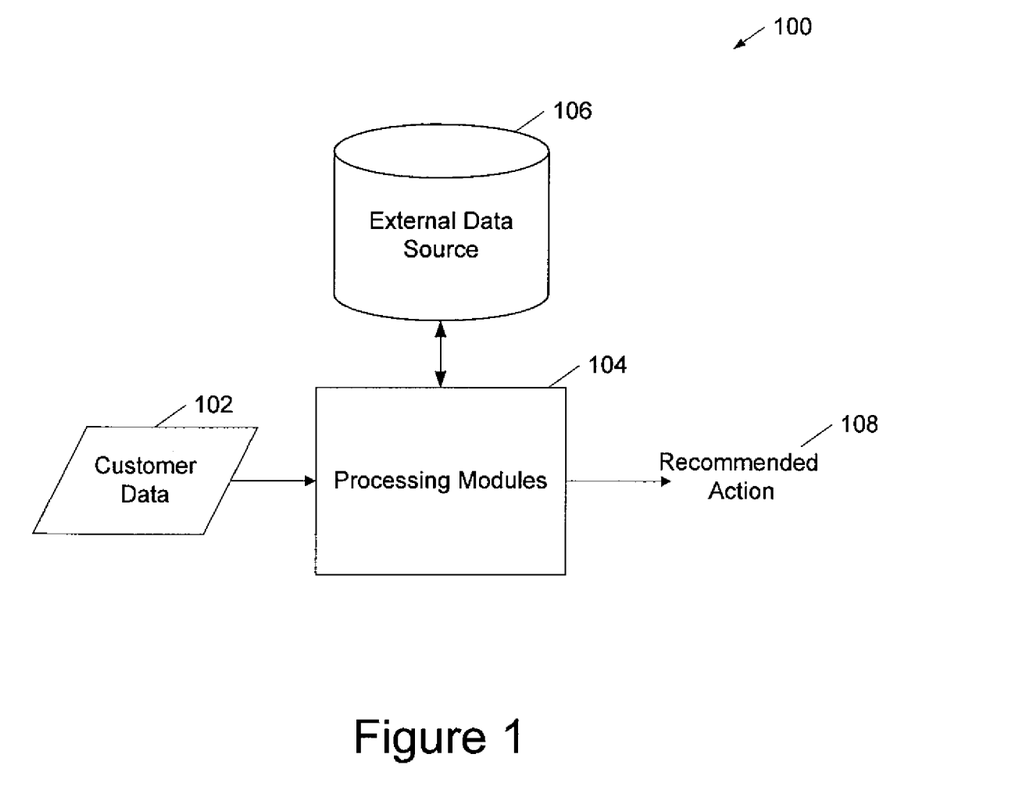
FIG. 1 is a block diagram of a customer service system according to various embodiments.

FIG. 1 comprises a block diagram of a customer service system 100 according to various embodiments. The system 100 comprises customer data 102, processing modules 104, external data source 106, and recommended action 108.

The customer data 102 may include information used to identify a customer and a customer's real estate or property. In one embodiment, this information may be collected by a financial institution or other business while providing services to the customer. The customer data 102 may be collected from the customer directly, or from other sources as well.

The processing modules 104 generally include routines, programs, objects, components, data structures, etc., that perform particular functions or implement particular abstract data types. The processing modules 104 process the customer data so that the data is in an appropriate form to be output and used to collect additional data from the external data sources 106. The processing modules 104 also may process and analyze the additional data from the external data sources 106 that is collected.

The external data sources 106 may be one or more public data sources including publicly accessible records. The records in the external data source may be accessed by the processing modules 104. In some embodiments, customer data 102 is used to access specific records within the external data sources 106. The external data sources 106 may include real estate or property information, related tax information or other relevant financial and property data. This data may be collected for analysis by the processing modules 104.

The recommended action 108 is output by the processing modules 104 as a result of the analysis of any data retrieved from the external data sources 106. For example, data obtained from records in the external data sources 106 may be compared to the existing customer data 102. If there are differences or discrepancies between the data obtained from the external data sources 106 and customer data 102, these differences may be analyzed to determine any effect the differences may have on a customer, financially or otherwise. In one embodiment, the recommended action is the result of the analysis, and suggests action a customer may take to deal with the new data.

Figure 2:
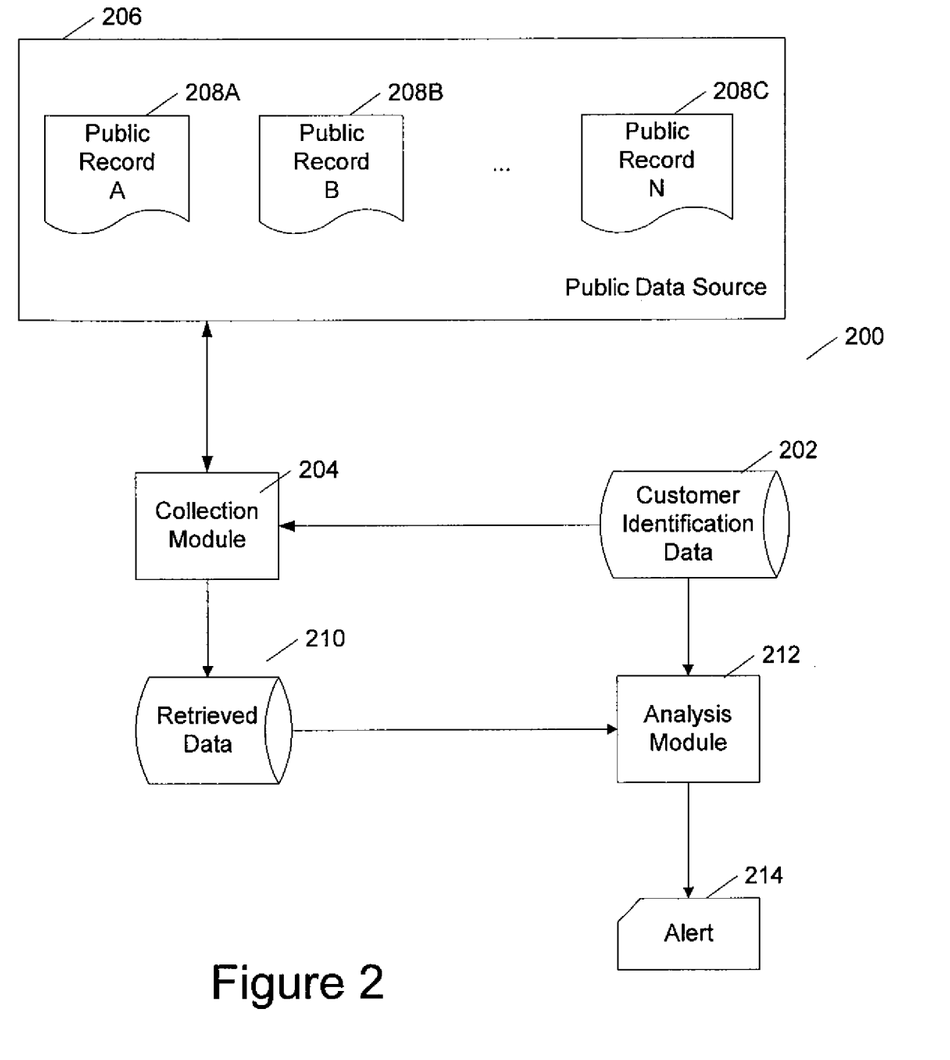
FIG. 2 is a more detailed block diagram of a customer service system according to various embodiments.

FIG. 2 is a more detailed block diagram of a customer service system 200 according to various embodiments. The system 200 comprises customer identification data 202, collection module 204, public data source 206, public records 208A-208C, retrieved data 210, analysis module 212 and alert 214.

For the purposes of this disclosure, a financial institution may include any actual financial establishment or other business offering financially related services, including insurance agencies, loan offices, and other like businesses. A financial institution may keep in their records a store of customer identification data 202. This data may be collected before offering services to a customer or during the service relationship. Customer identification data may include numerous fields of information identifying a customer, property, assets, and other characteristics.

In order to verify the customer identification data 202 or to collect additional data, a collection module 204 may be invoked. The collection module 204 may be invoked directly by a financial institution, or indirectly by a third party whose job it is to collect data. The collection module takes in the customer identification data and pulls out the relevant fields of information to be used to access a public data source 206. The public data source 206 may contain a number of public records 208A-208C. In order to retrieve a specific public record, public record B 208B for example, some of the customer identification data 202 associated with public record B 208B may be submitted. The collection module 204 submits the appropriate customer identification data 202, and retrieves the relevant public records 208A-208C. These records may then be stored as retrieved data 210.

The retrieved data 210 may be transmitted to the analysis module 212. The analysis module may analyze the retrieved data 210 and compare it with relevant customer identification data 202. Analyzed data may include property appraisal value, tax information, or other financially related data. The analysis module 212 may also update the customer identification data 202 with any of the retrieved data. In one embodiment, if discrepancies exist between the retrieved data 210 and the customer identification data 202, an alert 214 may be generated.

The alert 214 may be an alert which is internal to the financial institution, or one that is sent to a customer. The alert 214 may indicate that there is a discrepancy between customer identification data 202 and retrieved data 210, and may also include recommendations, suggestions or other information relevant to the discrepancy. Recommendations or suggestions may include for example, increasing insurance coverage on a property that has increased in value, or decreasing coverage on a property that has decreased in value. Other information may include tax related information regarding local or federal tax benefits that may be obtained based on the retrieved data 210. Additionally, according to other embodiments, action may be taken automatically by the financial institution when an indication of a discrepancy between customer identification data 202 and retrieved data 210 is found. This automatic action may be a financial service related action such as opening a new account, line of credit, placing a flag in an internal file, or other service.

Embodiments of the system for providing enhanced service using public records of FIGS. 1 and 2 allow a financial institution to be able to quickly and easily update customer information and provide products, services, and information related to the updated information. In one embodiment, this provides a useful result by avoiding gaps in insurance coverage. By alerting a customer when their insurance coverage does not accurately reflect the value of their property, the customer may be able to increase or decrease the amount of insurance coverage so that there is not a significant gap between the property value and the amount of insurance coverage. In other embodiments, this provides other beneficial financial recommendations based on changes to the customer's data.

Methods

In this section, particular methods of example embodiments are described by reference to a series of flow charts.

Figure 3:
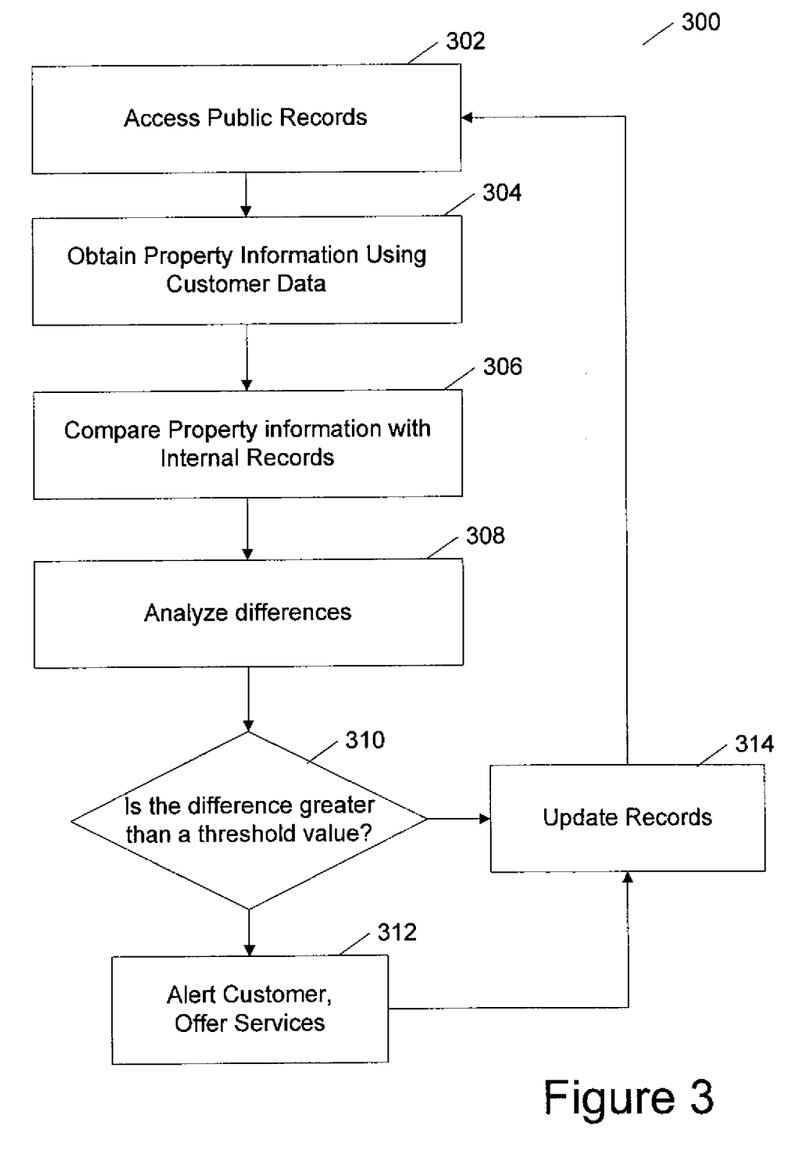
FIG. 3 is a flow diagram illustrating a customer service method according to various embodiments.

FIG. 3 is a flow diagram illustrating a customer service method 300 according to various embodiments. Method 300 comprises accessing public records (block 302), obtaining property information (block 304), comparing property information (block 306), analyzing differences (block 308), determining if a difference is greater than a threshold (block 310), alerting a customer (block 312), and updating records (block 314).

The method 300 begins by accessing public records (block 302). A financial institution may access a public records database which may generally be external to the financial institution. The public records database may include information relating to the customer, property, assets or other similar data. In order to access property information associated with a particular customer, certain customer data stored by the financial institution may be used. The customer data submitted may include name, address, property identification, or other information. The customer data may be submitted to the holder of the public records in order to obtain property information (block 304). The property information retrieved, including appraised property value, may be compared with existing data in the financial institution's internal records (block 306).

The existing data and retrieved property records are then analyzed to determine if any differences exist (block 308). If differences exist, a threshold may be set in which to consider the actual differences to be substantial enough to warrant further action. A determination may then be made as to whether the difference in the existing data and the retrieved property information is greater than the threshold (block 310). If the difference is not greater than the threshold, records may be merely updated to reflect any retrieved property information (block 314). If the difference is greater than the threshold, an alert may be generated to notify the customer, and offer any products or services that may be tailored to deal with the new property information (block 312).

After notifying the customer, a change in the existing data may take place. This change may be simply updating records (block 314), or may include changes to the products or services provided to the customer. For example, if the alert to the customer offers an increased coverage amount on a insurance policy, and the customer accepts the new insurance policy, the existing data may be updated to reflect the increased property value as well as the new policy coverage amount.

The method 300 may be performed manually, or automatically, on a one time basis or periodically. When performed periodically, retrieved property information may be stored and compared with past and future retrieved property information. This data may be used in any number of ways including notifying the customer or the financial institution of property value trends, changing tax consequences or other financially related circumstances.

Figure 4:
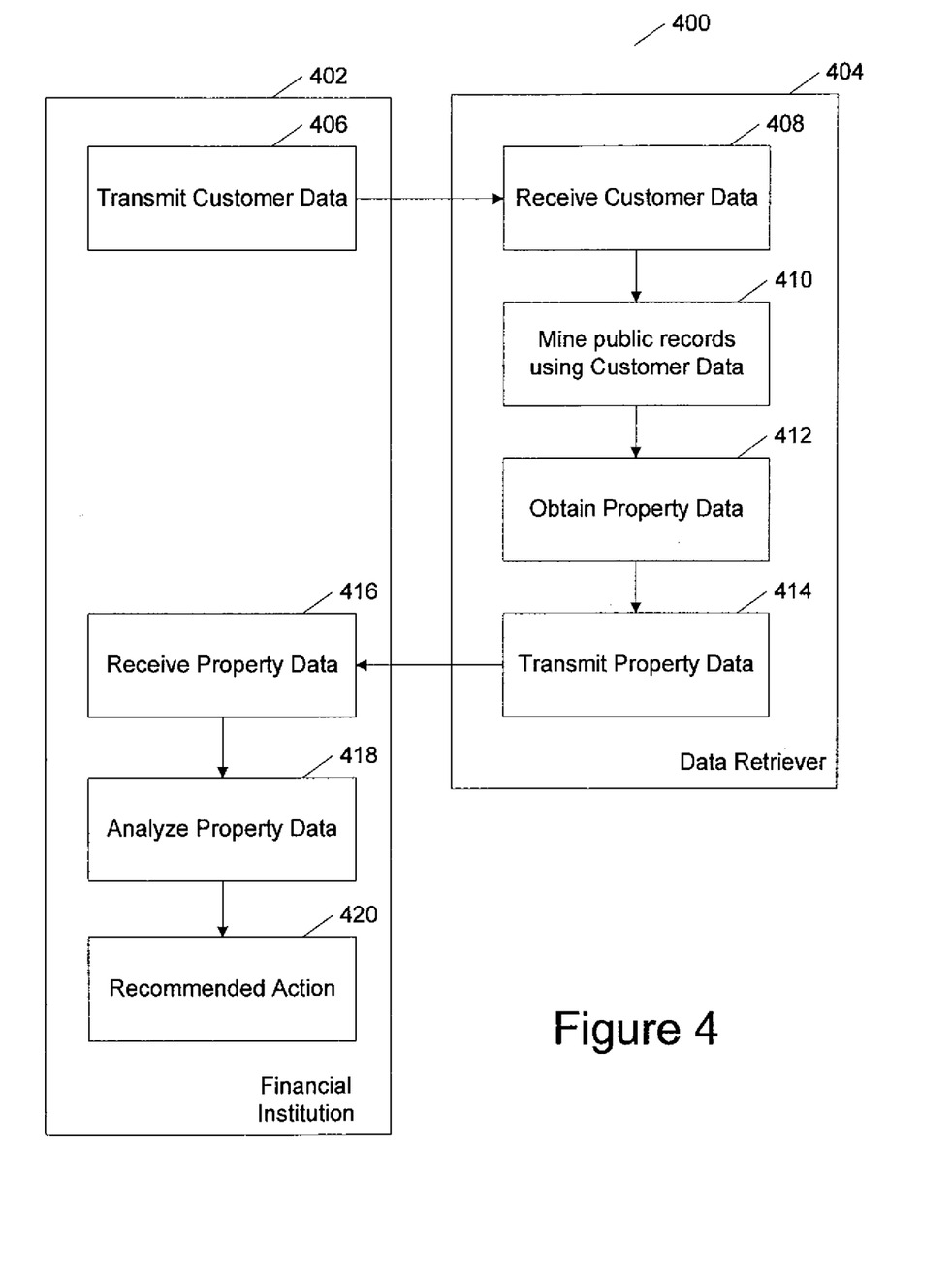
FIG. 4 is a flow diagram illustrating a customer service method with outsourced data retrieval according to various embodiments.

FIG. 4 is a flow diagram illustrating a customer service method 400 with outsourced data retrieval according to various embodiments. Method 400 comprises action by two parties: a financial institution 402 and a data retriever 404.

The financial institution 402 transmits customer data (block 406) to the data retriever 404 which may be a external company to the financial institution 402. The data retriever 404 receives the customer data from the financial institution 402 (block 408). Using the customer data, the data retriever may access and mine public records (block 410). The data mining may be accomplished in a number of ways including manually, screen scraping, retrieving Extensible Markup Language (XML) fields, or other automated methods. Once the public records are mined, property data associated with the transmitted customer data may be obtained (block 412). Once obtained, the data retriever 404 may transmit the property data to the financial institution 402 (block 414).

The financial institution 402 may receive the property data (block 416) that was obtained by the data retriever 404. This property data may then be analyzed (block 418) and compared with existing property data possessed by the financial institution. If differences exist between the retrieved property data and the existing property data, or if new data is retrieved, the financial institution may recommend action to be taken (block 420). This recommended action may be internal, or may be action recommended to the customer. Recommended action may include increasing or decreasing insurance policy coverage, obtaining a home equity loan or line of credit, obtaining alternate investment products or services, tax related advice, adding a note to an internal file to follow up with the customer, or other courses of action.

Example Implementations

Various examples of systems and methods for embodiments of the inventive subject matter have been described above. In this section FIG. 5 illustrates an example of changing property value data affecting a homeowners insurance policy.

Figure 5:
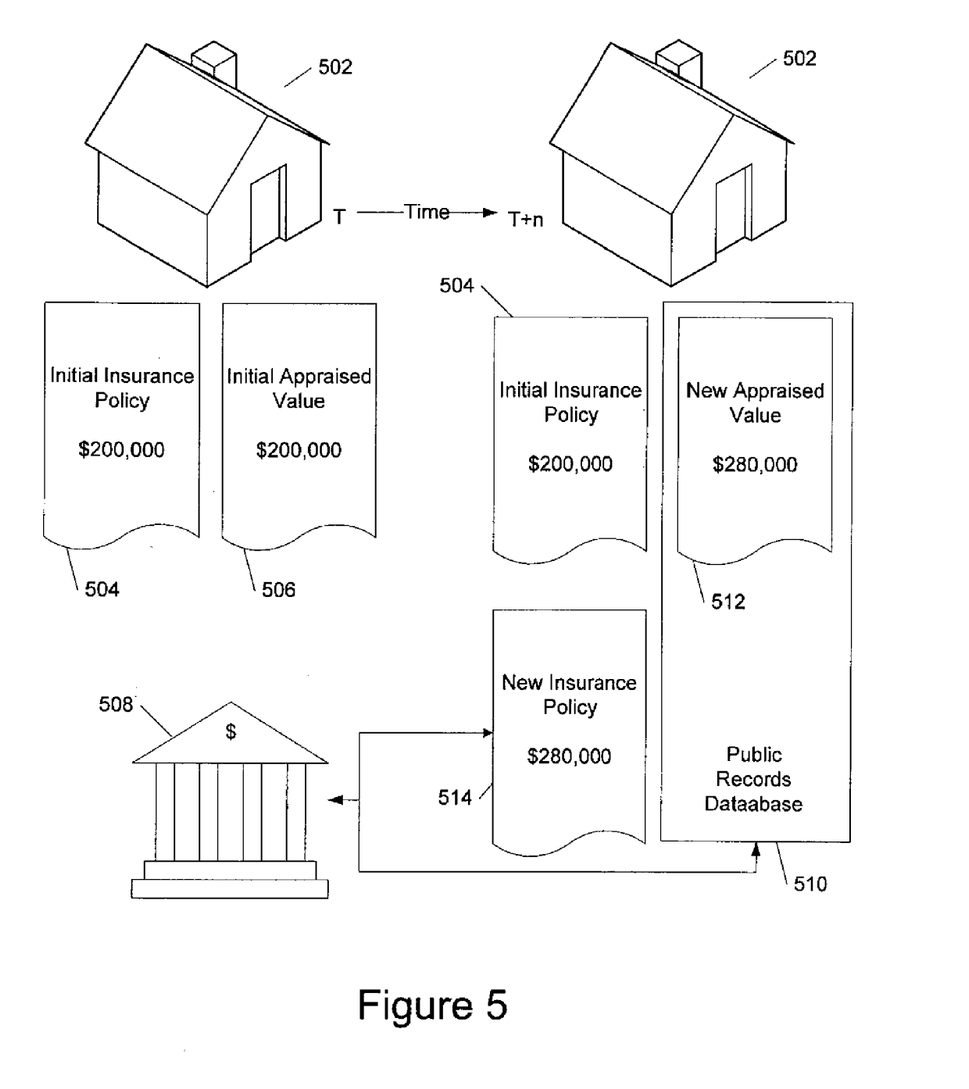
FIG. 5 is a graphic illustration of an example implementation according to various embodiments.

FIG. 5 is a graphic illustration of an example implementation according to various embodiments. FIG. 5 comprises property 502, an initial homeowners insurance policy 504, an initial appraised value 506, a financial institution 508, a public records database 510, a new appraised value 512, and a new insurance policy 514.

When a customer purchases an initial homeowners insurance policy 504 on a property 502, an initial appraised value 506 may be recorded by the financial institution 508. This value may be used by the financial institution and the customer to determine and appropriate policy coverage amount. The initial appraised value 506 may be given by the customer, or may be determined by a third party. At time T, when the initial homeowners insurance policy 504 is issued, the initial appraised value 506 of the property 502 may be $200,000 for example. The coverage on the initial homeowners insurance policy may therefore be approximately $200,000. It is generally desirable for the customer to have coverage on an insurance policy of an amount substantial enough to cover the property in the case of damage or destruction.

As time passes, the value of the property 502 may increase due to any number of factors including inflation, economic growth, new construction, zoning, etc. Alternatively, the value may decrease for any number of other reasons. Changes in the value of the property 502 may affect the amount of coverage needed on a homeowners insurance policy. In order to provide enhanced service to its customers, the financial institution 508 may initiate a procedure to access a public records database 510 in order to acquire data relating to the property 502. Since the financial institution 508 already has a relationship and a policy with the customer, it will have an amount of identifying data related to the customer and the property 502. This identifying data may be used when accessing the public records database 510. Data retrieved may include a new appraised value 512 for the property 502. This data may have been determined and recorded into a public records database 510 for tax and property appraisal purposes.

In the example in FIG. 5, the records in the public records database 510 include a new appraised value 512 indicating that the value of the property 502 has risen to $280,000. The financial institution 508 may compare the new appraised value 512 with the initial appraised value 506 and the coverage amount in the initial homeowners insurance policy 504. If the difference is greater than some threshold value, an alert or notification may be triggered. In this example, the difference between the new appraised value 512 is greater than the coverage amount on the initial homeowners insurance policy by $80,000, so a notification may be generated. The notification may inform the customer of the increase in the value of the property 502, and may suggest a new homeowners insurance policy 514 with an increased coverage amount.

The homeowner may have the option of accepting the recommendations from the financial institution 508, and acquiring the new homeowners insurance policy 514, and the recommended new homeowners insurance policy 514 may help to avoid gaps in coverage in case of damage or destruction of the property 502.

Other examples of notification generated from the acquisition of property data by a financial institution include offering home equity loans or lines of credit based on increased property appraisal values. The increased property appraisal values indicate an increased amount of equity in the property by the owner, thus allowing the owner to obtain credit based on that equity. Additionally, owners with decreased appraised values may want to reduce the amount of insurance coverage on their property, rather than pay premiums on coverage that is greater than the property value.

The gathering data from public records may also allow for the financial institution to be able to communicate any tax consequences or benefits that may arise out of the new data. The changing value of a property may be useful to know with regard to the tax consequences involved in estate planning for example. An increased property value may put the owner into a higher tax bracket for estate planning purposes, which might call for the use of different estate planning techniques such as trusts to minimize taxes. Additionally, the changing property value data may be useful with regard to property tax regulations. For example, laws or regulations regarding challenging appraisal values may apply to a customer's property. A financial institution may offer enhanced service to its customers by informing them or certain regulations and options that they may have based on their changing property value data.

Hardware and Operating Environment

This section provides an overview of an example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 6 below.

Figure 6:
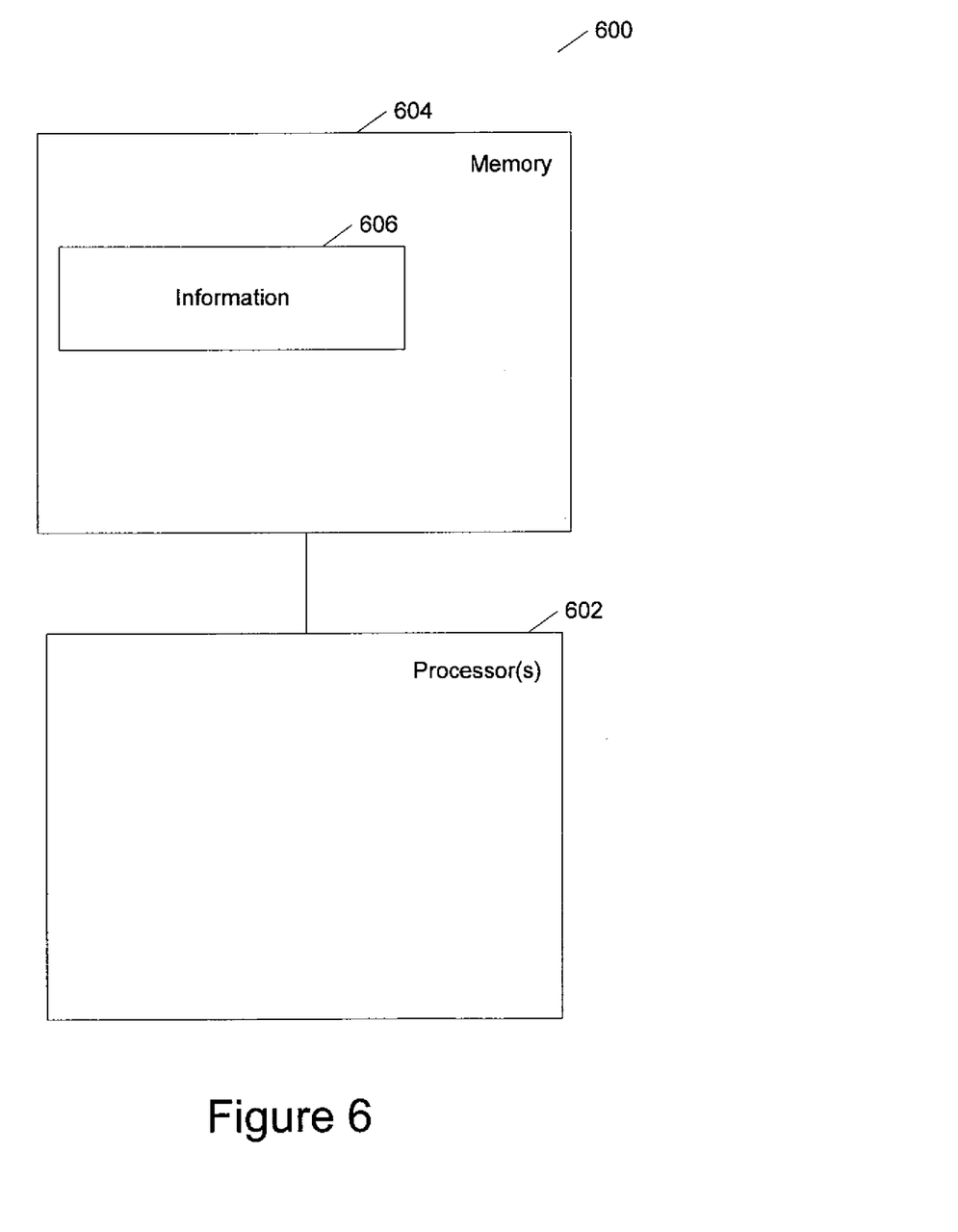
FIG. 6 is a block diagram of an article according to various embodiments.

FIG. 6 is a block diagram of an article 600 according to various embodiments of the invention. Such embodiments may comprise a computer, a memory system, a magnetic or optical disk, some other storage device, or any type of electronic device or system. The article 600 may include one or more processor(s) 602 coupled to a machine-accessible medium such as a memory 604 (e.g., a memory including electrical, optical, or electromagnetic elements). The medium may contain associated information 606 (e.g., computer program instructions, data, or both), which, when accessed, results in a machine (e.g., the processor(s) 602) performing the activities previously described herein.

Implementing the apparatus, systems, and methods disclosed herein may increase the level of service and insurance protection to customers. Automating the process may allow periodic updating of records based on access to numerous public records databases federally and locally in various states, counties, cities, appraisal districts, etc. The disclosed service enhancement may allow for improved protection against loss and coverage gaps as well as provide the customer with relevant tax and financially related information.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A method for analyzing homeowner insurance coverage, wherein the method is performed by executing instructions stored on a non-transitory computer readable medium with a number of processors, comprising:
   obtaining property value data including a value of a property by electronically accessing a third party database using customer identification data associated with a customer;
   comparing the property value data with homeowner insurance coverage data associated with the customer;
   notifying the customer if a difference between the property value data and the homeowner insurance coverage data exists; and
   offering additional financial products to the customer if a difference between the property value data and the homeowner insurance coverage data exists.

2. The method of claim 1, further comprising offering additional homeowners insurance coverage based on the property value data.

3. The method of claim 1, further comprising notifying the customer when the property value data is less than a homeowner insurance coverage amount.

4. The method of claim 3, further comprising offering reduced homeowners insurance coverage based on the property value data.

5. The method of claim 1, wherein the notifying is done automatically.

6. The method of claim 1, further comprising updating the homeowner insurance coverage data based on the property value data.

7. The method of claim 1, further comprising calculating a homeowner insurance premium based on the property value data.

8. A method for analyzing homeowner insurance coverage, wherein the method is performed by executing instructions stored on a non-transitory computer readable medium with a number of processors, comprising:
   obtaining property value data including a value of a property by electronically accessing a third party database using customer identification data associated with a customer;
   comparing the property value data with homeowner insurance coverage data associated with the customer; and
   recommending a change in homeowner insurance coverage based on a difference between the property value data and the homeowner insurance coverage data.

9. The method of claim 8, wherein recommending the change in homeowner insurance coverage includes an offer for additional homeowners insurance coverage based on the property value data.

10. The method of claim 8, wherein recommending the change in homeowner insurance coverage notifies the customer if the property value data is less than a homeowner insurance coverage amount.

11. The method of claim 8, wherein recommending the change in homeowner insurance coverage includes an offer for reduced homeowners insurance coverage based on the property value data.

12. The method of claim 8, wherein the recommendation is sent automatically.

13. The method of claim 8, wherein the homeowner insurance coverage data is updated based on the property value data.

14. The method of claim 8, further comprising calculating a homeowner insurance premium based on the property value data.

15. A method for analyzing homeowner insurance coverage, wherein the method is performed by executing instructions stored on a non-transitory computer readable medium with a number of processors, comprising:
   obtaining property value data by electronically accessing public records using customer identification data associated with a customer;
   comparing the property value data with homeowner insurance coverage data associated with the customer; and calculating a homeowner insurance premium based on the property value data if a difference between the property value data and the homeowner insurance coverage data exists.

16. The method of claim 15, further comprising offering additional homeowners insurance coverage based on the property value data.

17. The method of claim 15, further comprising notifying the customer if the property value data is less than a homeowner insurance coverage amount.

18. The method of claim 17, further comprising offering reduced homeowners insurance coverage based on the property value data.

19. The method of claim 15, wherein the notifying is done automatically.

20. The method of claim 15, further comprising updating the homeowner insurance coverage data based on the property value data.

* * * * *